G. SYMES.
Improvement in Apparatus for the Manufacture of Gas.
No. 130,164. Patented Aug. 6, 1872.

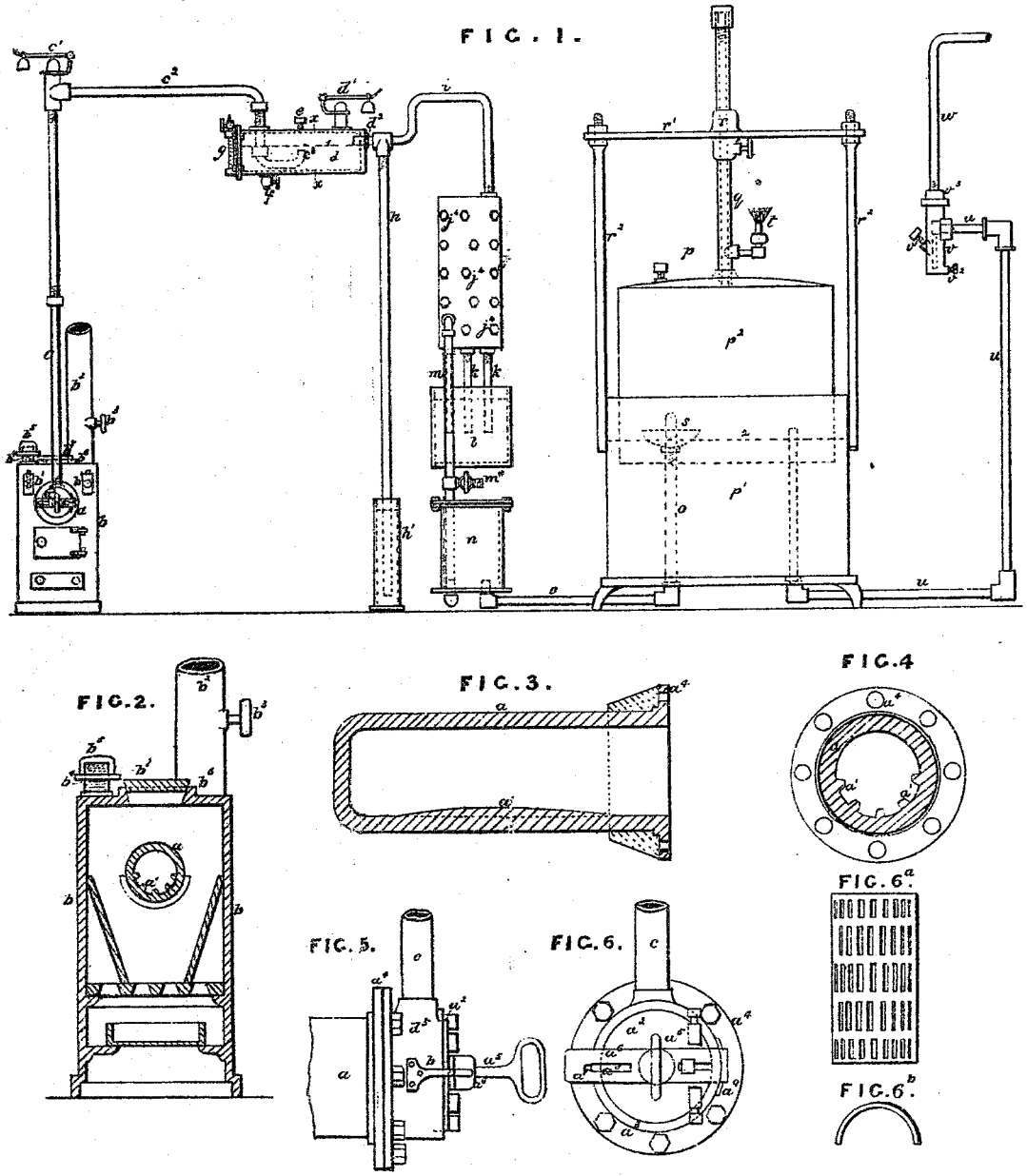
G. SYMES.
Improvement in Apparatus for the Manufacture of Gas.
No. 130,164. Patented Aug. 6, 1872.

Witnesses
H. Carlin Clark
Charles E. Chinn

Inventor
George Symes by
Dyer, Beadle +Co.
attys

G. SYMES.
Improvement in Apparatus for the Manufacture of Gas.
No. 130,164.            Patented Aug. 6, 1872.

Witnesses.
H. Caskie Clark
Charles E. Chinn

Inventor.
George Symes, by
Dyer, Beadle & Co.
attys.

UNITED STATES PATENT OFFICE.

GEORGE SYMES, OF LONDON, ENGLAND, ASSIGNOR TO WILLIAM BAIRD, JR., OF SAME PLACE.

IMPROVEMENT IN APPARATUS FOR THE MANUFACTURE OF GAS.

Specification forming part of Letters Patent No. 130,164, dated August 6, 1872.

I, GEORGE SYMES, of Vauxhall, London, England, engineer, have invented certain "Improvements in Portable Apparatus for Manufacturing Gas," of which the following specification is a full, clear, and exact description.

The object of my invention is the introduction into common use of a cheap and simple apparatus for manufacturing illuminating-gas, which apparatus, without danger of explosion or other unpleasant consequences, may be readily and conveniently placed and used in private dwelling-houses, offices, shops, warehouses, factories, and other buildings, and may also be advantageously adapted for railway carriages and signal-ships, steam-boats, and other vessels, and may be used in all cases where it is necessary or desirable to have a pure and brilliant light without great expense either in providing the apparatus or in the production of the light, and where it is absolutely necessary that there should be no danger from an explosion at any part of the apparatus.

I prefer to generate the gas from wood; but may use coal, paper, peat, resin, "dead-oil," and other materials; and I wish it distinctly understood that no part of my said invention relates to the novel use of any particular substance or compound for producing the gas. For burning the wood or other substance the apparatus is provided with a circular box or retort of iron, fire-clay, or other suitable material, which may be placed in a kitchen-range, in any ordinary stove, or in a stove especially constructed for the purpose. The form of this box or retort allows it to be surrounded by the fire, and I thereby obtain a quick and economical production of gas. The said box is preferably closed by a cover or mouth-piece fitted to a face like a valve instead of being "luted" or made tight by means of lime or cement, as in ordinary gas-retorts. The said retort is connected, by a pipe or tube, to a hydraulic main which may be a cylindrical vessel of cast-iron or other suitable metal, and may be placed in the chimney or arranged and supported in any convenient position in or near the house or structure. This vessel is partially filled with water, and the pipe or tube which connects the retort with the hydraulic main extends down into the water, its opening being below the surface thereof. The hydraulic main is provided with a safety-valve, and when the pressure in the retort rises above a certain degree the safety-valve is forced open and the gas escapes into the chimney or into a pipe or passage leading into the same. Except when the safety-valve is thus open, the gas flows from the pipe into the water, and, by having the opening of the pipe below the surface of the water, the apparatus will work with a pressure considerably less than if the gas entered the main above the water. The exit-pipe for the gas is at the top of the hydraulic main, and the tar-pipe is at the end or side thereof level with the surface of the water. The aforesaid main is provided with a covered aperture for pouring in the water, and with a cock or tap for permitting the same to escape. By this means the level of the water in the main can be so regulated as to insure the continual proper working of the apparatus. The gaseous products of combustion received from the retort into the hydraulic main are, by the latter, separated, so that the gas passes away through the exit-pipe, while the tar and other impurities, except the sulphur, are carried off by the tar-pipe, which terminates in a larger tube or cylindrical vessel arranged below the main. The hydraulic main is connected, by the gas-exit pipe or tube, to a condenser, which is a vessel having within it a series of vertical partition-plates and transverse obstructing-pieces, so arranged that the gas passes alternately over one and under the other till it leaves the condenser. The latter is connected to a purifying-vessel, which is divided vertically into two chambers, in one of which there is a series of sieves containing lime, and in the other a series of sieves containing sawdust, sand, or other suitable material. The gas, as it enters the purifier, passes up through the lime, enters the second chamber, descends through the sawdust, and thence passes, free from sulphur, away, through a suitable pipe or tube, to the gas-holder. The said gas-holder may be a cylindrical or other shaped vessel, made of sheet-iron, zinc, or other suitable metal. This vessel is partially filled with water, in which an inverted chamber rises and descends; or, instead of this metal gas-holder, I may use air-tight bags made of India rubber, gutta-percha, leather, or other flexible material. The gas passes away from the holder to the service-pipe, from which it is conducted to the burner. In cases where it is necessary or desirable to increase the brilliancy or power of the light I provide a small carbureting-vessel, which is filled with cotton or other fibrous material, saturated with undistilled naphtha or other carbonaceous liquid. The gas passes from the gas-holder into this vessel, where it absorbs carbon, and is taken therefrom to the service-pipe.

Description of the Drawing.

Figure 1 is a side elevation of my improved apparatus complete. Fig. 2 is a vertical section of the stove shown in Fig. 1. Fig. 3 is a longitudinal section of the retort of the said apparatus. Fig. 4 is a transverse section of the same. Fig. 5 is a side view; and Fig. 6, a front view, showing the cover secured upon the said retort. Figs. $6^a$ and $6^b$ show a perforated screen for the said retort, as hereinafter described. Figs. 3 to 9 and Fig. 17 are drawn to an enlarged scale.

Like letters indicate the same parts throughout the drawing.

In Fig. 1, I have shown the retort $a$ placed in a stove, $b$, constructed especially for my apparatus; but this stove will not always be required, as the retort may in many cases be placed in the kitchen-range or cooking stove of a dwelling-house, as shown in Fig. 18. The stove $b$ is provided with small slides, $b^1$, for regulating the draft, and the stove-pipe or chimney $b^2$ is furnished with a damper, $b^3$. $b^4$ is a screw-connection, which is shown covered with a cap, $b^5$; but this cap may be removed and a pipe screwed on the connection $b^4$ to convey heated air to any part of the building for warming the rooms or for other purposes. $b^6$ is a raised rim with an aperture in its center, over which a kettle or other vessel may be placed. $b^7$ is a metal plate for covering the said aperture, and which serves for heating plates and dishes, flat-irons, and other articles.

The retort $a$ is constructed with internal longitudinal bars or ribs $a^1$, as shown in Figs. 3 and 4, which are so curved or inclined, as shown, that, at the center of the retort, they project considerably above its inner periphery, while their ends are merged into the same. The external periphery of the retort is not changed by these ribs, but forms in transverse section a complete circle. By this means I greatly strengthen the retort without impeding the transmission of heat into it, and I prevent the injury to which the said retort would otherwise be subjected from the unequal expansion of its interior and exterior surfaces. $a^2$ is the cover or mouth-piece of the retort. This mouth-piece is hinged on the frame $a^3$, which is secured to the retort by screw-bolts passed through the flanges $a^4$. The said cover is made conical, as shown in Fig. 5, and is well fitted into a conical seat like a valve, and, therefore, when properly closed, will be tight without luting. The cover is secured when closed by the screw $a^5$ passed through the sliding bar $a^6$. The said bar is held at one end by the catch $a^7$, which passes through the slot $a^8$ in the bar, and at the other end is made to slide like a bolt into a mortise in the plate $a^9$. The said catch and plate are fixed on the frame $a^3$. When the bar is inserted in the mortise its other end will be held under the catch $a^7$; the screw $a^5$ is then tightened upon the cover, which is thereby forced securely into its conical seat. When the said cover is to be opened the screw $a^5$ is slackened and the bar drawn out of the socket and clear of the catch; the cover can then be turned back on its hinges.

When the gas is to be generated from coal I use the semicircular perforated plate or screen, Figs. $6^a$ and $6^b$, which, in charging the retort, is placed in the bottom of the scoop used for that purpose. When the charge of coal is deposited in the bottom of the retort the said screen is turned over and lies on the top of the coal. This device prevents the stoppage of the stand-pipe leading from the retort to the hydraulic main by the expansion of the coal, while permitting the free passage of the gas through the perforations. The aforesaid pipe $c$, which connects the retort $a$ with the hydraulic main $d$, has a safety-valve, $c^1$, on the top. This safety-valve prevents the possibility of an explosion through a stoppage of the pipe, which might sometimes be caused by an accumulation of tar at the end of the said pipe under the water.

Figure 7:
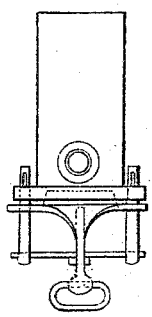
Figs. 7, 8, and 9 are a plan, transverse section, and front view of a modification of my improved retort, showing the same as I prefer to make it when the gas is to be generated from oil.
Figure 8:
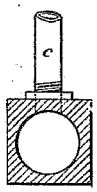
Figure 9:
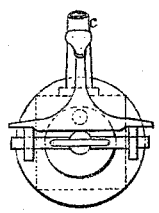
Figure 10:
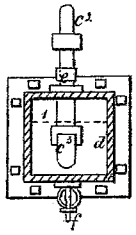
Fig. 10 is a transverse section of the hydraulic main of the said apparatus on the line $x\,x$, Fig. 1.
Figure 15:
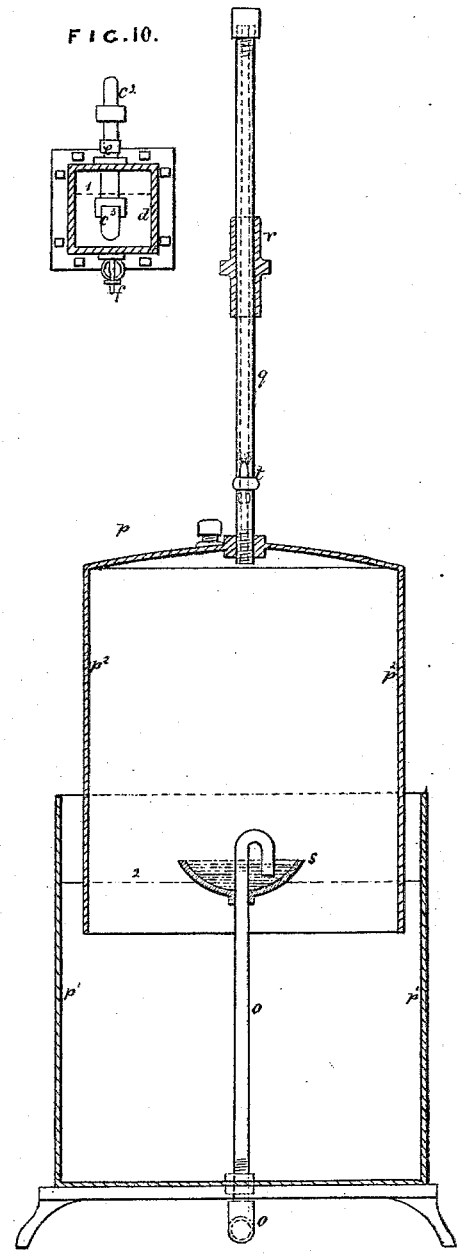
Fig. 15 is a vertical transverse section of the gas-holder shown in Fig. 1.
Figure 11:
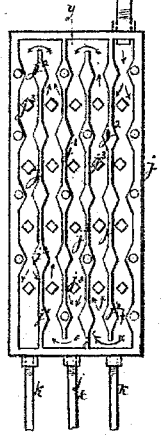
Fig. 11 is a front view of the condenser of the said apparatus, with the cover removed.
Figure 12:
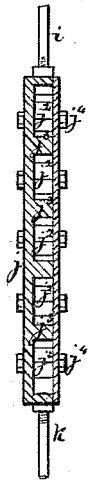
Fig. 12 is a vertical section of the same on the line $y\,y$, Fig. 11.
Figure 13:
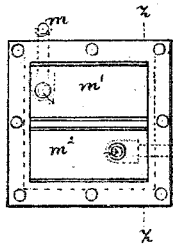
Fig. 13 is a plan or top view of the purifier of the said apparatus with the cover removed.
Figure 14:
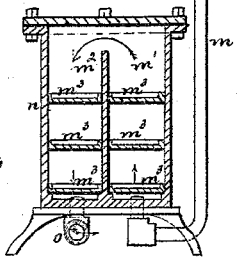
Fig. 14 is a vertical section on the line $z\,z$, Fig. 13.
Figure 16:
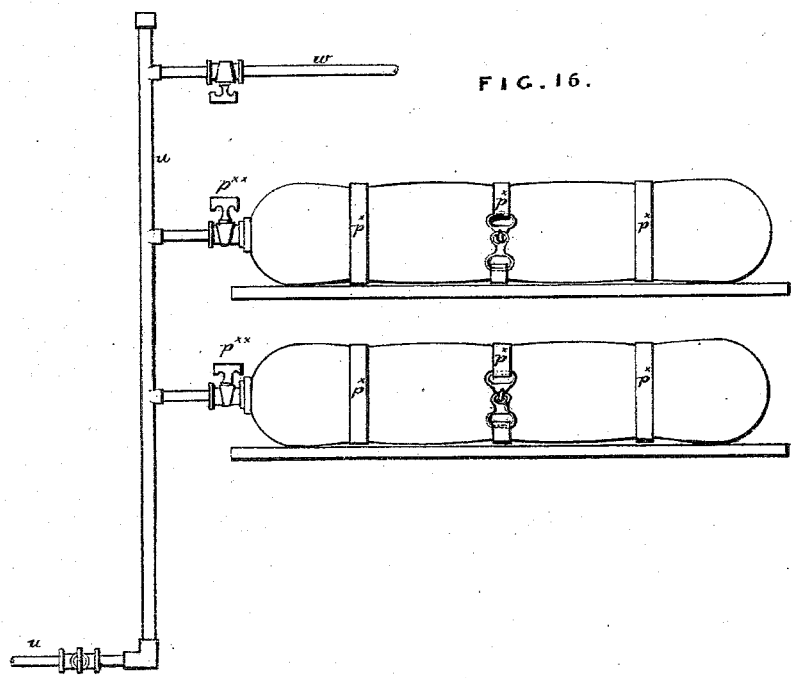
Fig. 16 illustrates the arrangement of the elastic bags, which may be used instead of the said holder.
Figures 17, 18:
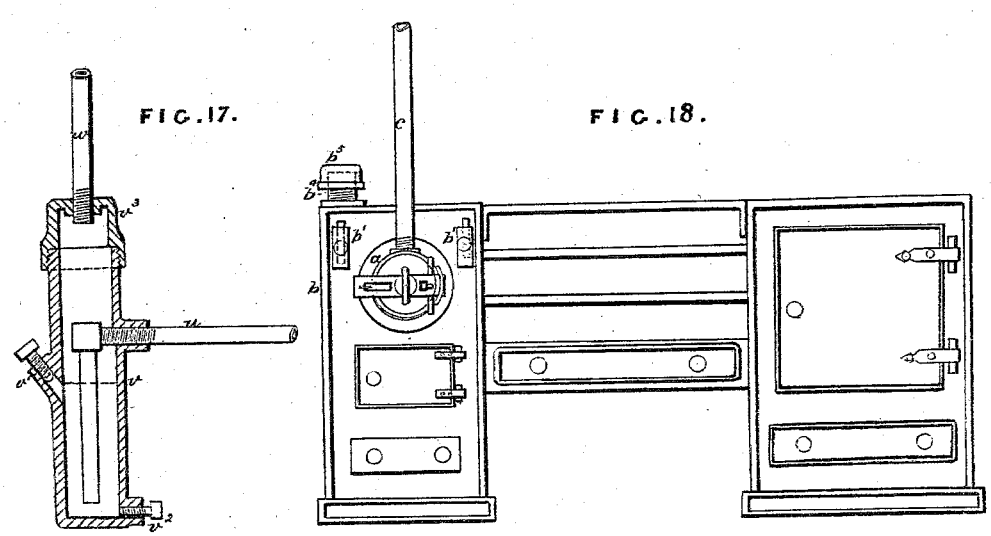
Fig. 17 is a section of the carbureting-vessel.
Fig. 18 illustrates the manner of using my improved apparatus in connection with an ordinary kitchen-range.

By referring to Fig. 1 it will be seen that the pipe $c$ has a horizontal part, $c^2$, which is connected to the main $d$ and extends into the same, its end $c^3$ being bent upward and terminating below the water-line 1 in the said main; consequently the gas, as it leaves the said pipe, rises through the water instead of being blown against it, as in other gas apparatus. My apparatus will therefore work at a very low pressure, and, when burned, the gas will be found entirely free from moisture, and consequently will be much cleaner and will possess much greater illuminating power than the gas now commonly used. The safety-valve $d^1$ on the hydraulic main will relieve the same and the other vessels from excessive pressure of the gas that has passed through the water. It will therefore be seen that by these two valves all danger of explosion at any part of the apparatus is entirely obviated. $e$ is a cover for closing the aperture through which the water is introduced into the main. $f$ is a cock for withdrawing the dirty water therefrom, and $g$ is a gage for indicating the height of the water in the main. The tar deposited by the gas in the said main passes from the surface of the water, through the aperture $d^2$, down the pipe $h$, into the vessel $h^1$, which is partially filled with water. The bent pipe $i$ connects the hydraulic main with the condenser $j$. The peculiar construction of the latter vessel is clearly illustrated in Figs. 11 and 12. $j^1 j^1 j^1 j^1$ are the vertical partitions, at the sides of which are the transverse obstructing-pieces $j^2$, while between the latter are bars $j^3$, which also form obstructions. These obstructing-pieces $j^2$ $j^3$ are secured in the condenser by bolts $j^4$ passing through them and the cover. The direction taken by the gas in its passage through this condensing-vessel is indicated by the arrows; and it will be readily understood that, by the peculiar arrangement of the vertical partitions and transverse obstructions, the flow of gas through this vessel is checked and the gas is divided, so that its condensation is thoroughly accomplished, and thus I obtain in a small compass what has hitherto required a vessel occupying considerable space. The condenser $j$ is provided with tar-pipes $k$, whose lower ends are immersed in water in the vessel $l$; and the tar which would otherwise accumulate in the condenser is conducted away through these pipes. The said condenser is connected by the pipe $m$ with the purifier $n$; but as the gas before being purified serves best for heating purposes, I place between the two vessels a cock, $m^x$, from which I may conduct the unpurified gas away to a stove or other heating apparatus. This purifying-vessel $n$, as clearly shown in Figs. 13 and 14, is divided vertically into two chambers, $m^1$ $m^2$, in each of which I place a series of sieves, $m^3$. The sieves in chamber $m^1$, into which the gas is first admitted from the condenser, are filled with lime; sieves of the other chamber may also be filled with lime; or they may be filled with sawdust, sand, or other suitable filtering material. From the chamber $m^2$ of the said purifier the gas passes through the pipe $o$ to the holder $p$. The lower vessel $p^1$ of this holder is filled with water to the line 2, and the upper inverted vessel $p^2$ rises and sinks in the water as the volume of gas in the holder is increased or diminished. The said upper vessel is guided by means of the tube $q$ or a perforated rod which slides through the sleeve $r$ on the cross-bar $r^1$, which is supported on the uprights $r^2$. The tube $o$ extends up through the water in the vessel $p^1$, and above the water-line is bent down, as shown, into a bowl or cup, $s$, containing water. This cup is filled through an aperture in the top of the vessel $p^2$, which is closed by a plug. By this means the end of the pipe $o$ is sealed and the return of gas from the holder down the said pipe is prevented. To still further insure the safety of the apparatus I provide the sleeve $r$ with a pinching-screw, which I can tighten against the tube $q$, and thereby lock and retain the vessel $p^2$, so that it shall exert no downward pressure upon the gas in the holder. When this is done no escape of gas can occur at any one of the burners or at the joints or connections of the apparatus. $t$ is a burner, for testing the quality of the gas in the holder. The elastic bags, Fig. 16, which are sometimes used instead of the holder $p$, are provided with elastic bands $p^*$, which will yield to allow the bag to be inflated with gas, but which, when the cock $p^{**}$ is opened, will tend continually to close the bag and expel the gas therefrom into the service-pipe. The outlet-pipe $u$ may either conduct the gas direct from the holder $p$ (or the elastic bags) to the service-pipe and burners or to the carbureting-vessel $v$, as shown in Fig. 1. This vessel is filled with cotton, wool, or other suitable absorbent substance, saturated with benzine, naphtha, or other hydrocarbon, and the end of the pipe $u$ is inserted in the same. This arrangement prevents any return of the gas through the vessel $v$ into the holder. $v^1$ is the aperture for pouring in the hydrocarbon, and $v^2$ the aperture for withdrawing the same. These apertures are secured by suitable plugs, as shown. $w$ is the service-pipe, which is secured in the vessel $v$ by the cap $v^3$.

Claims.

1. The circular retort, plain on its external periphery, with internal longitudinal ribs or bars, and with a cover fitted to a face or seat like a valve, and made tight without luting, substantially as set forth, and for the purposes specified.

2. The hydraulic main, constructed as herein specified, and connected to the retort by a pipe, whose end enters and admits the gas into the said main under the surface of the water therein, substantially as set forth, for the purposes specified.

3. The apparatus consisting of the retort $a$, hydraulic main $d$, and the condensing and purifying vessels $j$ and $n$, constructed substantially as set forth, in combination, together and with the gas-holder $p$, or elastic bags or other suitable reservoir, and with or without the carbureting-vessel, substantially as herein described, for the purposes specified.

GEORGE SYMES.

Witnesses:
 J. R. STEVENS, Sol.,
  4 Nicholas Lane, London.
 ISAAC DODS, Gentleman,
  31 Lombard street, London.